(12) United States Patent
Brewer et al.

(10) Patent No.: US 7,613,183 B1
(45) Date of Patent: Nov. 3, 2009

(54) SYSTEM AND METHOD FOR ROUTER DATA AGGREGATION AND DELIVERY

(75) Inventors: Tony M. Brewer, Plano, TX (US);
Harry C. Blackmon, Plano, TX (US);
Chris Davies, Dallas, TX (US); Harold W. Dozier, Dallas, TX (US); Thomas C. McDermott, III, Plano, TX (US);
Steven J. Wallach, Dallas, TX (US);
Dean E. Walker, Plano, TX (US); Lou Yeh, Plano, TX (US)

(73) Assignee: Foundry Networks, Inc., Santa Clara, CA (US)

( * ) Notice: Subject to any disclaimer, the term of this patent is extended or adjusted under 35 U.S.C. 154(b) by 397 days.

(21) Appl. No.: 09/703,038

(22) Filed: Oct. 31, 2000

(51) Int. Cl.
*H04L 12/28* (2006.01)
(52) U.S. Cl. .................. 370/392; 370/352; 370/395.51
(58) Field of Classification Search .................. 370/392,
370/393, 471, 474, 401, 466, 412, 351, 311,
370/329, 335, 342, 347, 486, 424, 389, 394,
370/397, 344, 405, 539, 386, 387, 388, 395.51,
370/465, 469; 398/54; 345/634; 704/5;
717/113, 168; 714/755, 757, 765, 784
See application file for complete search history.

(56) References Cited

U.S. PATENT DOCUMENTS

| | | | | |
|---|---|---|---|---|
| 4,922,486 A | * | 5/1990 | Lidinsky et al. | 370/427 |
| 5,500,858 A | | 3/1996 | McKeown | 370/60 |
| 5,544,161 A | * | 8/1996 | Bigham et al. | 370/397 |
| 5,577,180 A | * | 11/1996 | Reed | 345/634 |
| 5,583,859 A | * | 12/1996 | Feldmeier | 370/471 |
| 5,583,863 A | * | 12/1996 | Darr et al. | 370/397 |
| 5,590,122 A | * | 12/1996 | Sandorfi et al. | 370/394 |
| 5,627,836 A | * | 5/1997 | Conoscenti et al. | 370/397 |

(Continued)

OTHER PUBLICATIONS

GB 2,086,184A, UK Patent Application, Inventor: Martin, Spendley, Title: Dialled Digit Receiver, puplushed: May 6, 1982.*

(Continued)

*Primary Examiner*—Phirin Sam
(74) *Attorney, Agent, or Firm*—Park, Vaughan & Fleming LLP

(57) ABSTRACT

A chunk format for a large-scale, high data throughput router includes a preamble that allows each individual chunk to have clock and data recovery performed before the chunk data is retrieved. The format includes a chunk header that contains information specific to the entire chunk. A chunk according to the present format can contain multiple packet segments, with each segment having its own packet header for packet-specific information. The format provides for a scrambler seed which allows scrambling the data to achieve a favorable zero and one balance as well as minimal run lengths. There are forward error correction (FEC) bytes as well as a chunk cyclical redundancy check (CRC) to detect and/or correct any errors and also to insure a high degree of data and control integrity. Advantageously, a framing symbol inserted into the chunk format itself allows the receiving circuitry to identify or locate a particular chunk format. "Break Bytes" and "Make Bytes" fields located at the beginning of a chunk preamble precondition an optical receiver to a proper state before the actual chunk arrives at the receiver.

47 Claims, 3 Drawing Sheets

U.S. PATENT DOCUMENTS

| | | | | |
|---|---|---|---|---|
| 5,691,983 | A * | 11/1997 | Nawata | 370/344 |
| 5,691,984 | A * | 11/1997 | Gardner et al. | 370/401 |
| 5,694,438 | A * | 12/1997 | Wang et al. | 375/347 |
| 5,708,961 | A * | 1/1998 | Hylton et al. | 725/81 |
| 5,896,374 | A * | 4/1999 | Okumura et al. | 370/311 |
| 5,903,324 | A * | 5/1999 | Lyons et al. | 375/240.26 |
| 6,061,358 | A * | 5/2000 | Nelson et al. | 370/412 |
| 6,081,570 | A * | 6/2000 | Ghuman et al. | 375/368 |
| 6,081,650 | A * | 6/2000 | Lyons et al. | 386/95 |
| 6,151,318 | A * | 11/2000 | Woodward et al. | 370/392 |
| 6,226,296 | B1 * | 5/2001 | Lindsey et al. | 370/401 |
| 6,278,709 | B1 * | 8/2001 | Walker et al. | 370/392 |
| 6,330,245 | B1 * | 12/2001 | Brewer et al. | 370/424 |
| 6,335,992 | B1 * | 1/2002 | Bala et al. | 385/17 |
| 6,438,515 | B1 * | 8/2002 | Crawford et al. | 704/5 |
| 6,463,506 | B1 * | 10/2002 | McAllister et al. | 711/118 |
| 6,470,007 | B1 * | 10/2002 | Berman | 370/351 |
| 6,496,901 | B1 * | 12/2002 | De Martine et al. | 711/113 |
| 6,516,435 | B1 * | 2/2003 | Tsunoda | 714/751 |
| 6,522,667 | B1 * | 2/2003 | Oda et al. | 370/474 |
| 6,526,574 | B1 * | 2/2003 | Jones | 717/168 |
| 6,567,199 | B1 * | 5/2003 | Nakaoka et al. | 398/183 |
| 6,594,278 | B1 * | 7/2003 | Baroudi | 370/466 |
| 6,633,564 | B1 * | 10/2003 | Steer et al. | 370/389 |
| 6,658,010 | B1 * | 12/2003 | Enns et al. | 370/401 |
| 6,665,495 | B1 * | 12/2003 | Miles et al. | 398/54 |
| 6,687,247 | B1 * | 2/2004 | Wilford et al. | 370/392 |
| 6,701,088 | B1 * | 3/2004 | Watanabe et al. | 398/51 |
| 6,711,357 | B1 * | 3/2004 | Brewer et al. | 398/54 |
| 6,718,139 | B1 * | 4/2004 | Finan et al. | 398/59 |
| 6,829,237 | B2 * | 12/2004 | Carson et al. | 370/386 |
| 6,829,437 | B2 * | 12/2004 | Kirby | 398/57 |
| 6,839,322 | B1 * | 1/2005 | Ashwood Smith | 370/235 |
| 6,970,648 | B2 * | 11/2005 | Ofek et al. | 398/75 |
| 7,139,247 | B2 * | 11/2006 | Desai et al. | 370/255 |
| 2001/0010694 | A1 * | 8/2001 | Lindsey et al. | 370/405 |
| 2001/0046208 | A1 * | 11/2001 | Eng et al. | 370/229 |
| 2002/0044555 | A1 * | 4/2002 | Kamo et al. | 370/395.1 |
| 2002/0080829 | A1 * | 6/2002 | Ofek et al. | 370/539 |

OTHER PUBLICATIONS

Fred Halsall, Data Communications Computer Network and Open Systems, 1996, Addison-Weslet Publishing Company, Fourth Edition, pp. 110 and 111.*

Recommendations on Queue Management and Congestion Avoidance in the Internet; Network Working Group; Cisco Systems; B. Braden et al; Apr. 1998.

Scalable High Speed IP routing Lookups; Computer Engineering and Networks Laboratory; Maracel Waldvogel et al.; 1997.

M40 Internet Backbone Router; Juniper Networks.

A 50-Gb/s IP Router; IEEE/ACM Transactions on Networking; Craig Partridge et al; Jun. 1998.

Achieving 100% Throughput in an Input-Queued Switch; Department of Electrical Engineering; Nick McKeown; 1996.

Fast Switched Backplane for a Gigabit Switched Router; Department of Electrical Engineering; Nick McKeown.

Lee and Kims "Scrambling Techniques for Digital Transmission"; 1994.

U.S. Appl. No. 09/703,057, Brewer et al.
U.S. Appl. No. 09/703,056, Brewer et al.
U.S. Appl. No. 09/703,027, Blackmon et al.
U.S. Appl. No. 09/703,064, McDermott III, et al.
U.S. Appl. No. 09/702,958, Brewer et al.
U.S. Appl. No. 09/703,043, Blackmon et al.

Bux W. e al., "Technologies and Building Blocks For Fast Packet Forwarding," IEEE Communications Magazine, IEEE Service Center, Piscataway, N.J., US, vol. 39, No. 1 Jan. 1, 2001, pp. 70-77.

Araki, Henmi, Maeno, Matsuda, Saisho, "Photonic Core Node Based on a 2.56Tbit/sopto-electonic switch fabric," WTC/ISS2000, Birmingham, UK, May 7, 2000.

Maeno Y et al., "A Skew-Insensitive Synchronization Scheme For Bandwidth Effective Terabits Per Second Optoelectronic Packet-Switch Fabrics," IEEE Photonics Technology Letters, IEEE Inc. New York, US, vol. 11, No. 12, Dec. 1999, pp. 1674-1676.

Minkenberg C et al., "A Robust Switch Arthitecture For Bursty Traffic," Broadband Communications, 2000 Proceedings, 2000 International Zurich Seminar in Zurich, Swizerland, Feb. 15-17, 2000, Piscataway, NE, USA, IEEE, US, Feb. 15, 2000, pp. 207-214.

European Search Report mailed Feb. 12, 2004 for EP01309174.9.

* cited by examiner

SYSTEM AND METHOD FOR ROUTER DATA AGGREGATION AND DELIVERY

RELATED APPLICATIONS

This application is related to concurrently filed, co-pending, and commonly assigned U.S. application Ser. No. 09/703,057, filed Oct. 31, 2000, entitled "System And Method For IP Router With an Optical Core," to concurrently filed, co-pending, and commonly assigned U.S. application Ser. No. 09/703,056, filed Oct. 31, 2000, entitled "System and Method for Router Central Arbitration," to concurrently filed, co-pending, and commonly assigned U.S. application Ser. No. 09/702,958, filed Oct. 31, 2000, entitled "Timing and Synchronization for an IP Router Using an Optical Switch," to concurrently filed, co-pending, and commonly assigned U.S. application Ser. No. 09/703,027, filed Oct. 31, 2000, entitled "Router Network Protection Using Multiple Facility Interfaces," to concurrently filed, co-pending, and commonly assigned U.S. application Ser. No. 09/703,043, filed Oct. 31, 2000, entitled "Router Line Card Protection Using One-for-N Redundancy" and to concurrently filed, co-pending, and commonly assigned U.S. application Ser. No. 09/703,064, filed Oct. 31, 2000, entitled "Router Switch Fabric Protection Using Forward Error Correction," the disclosures of which are incorporated herein by reference.

TECHNICAL FIELD

This application relates to the field of optical communication networks, and particularly to large-scale routers for optical communication networks.

BACKGROUND

In an optical router the information that passes through the core switching fabric is a chunk of information that must go from the input side of a line shelf through the optical switch itself to the egress side of a switch shelf. No storage is available in the optical switch itself. Therefore the information must be formatted in such a way that data passes through the optical switch and is collected on the egress side, such that every chunk that is collected can potentially require a different phase adjustment for clock and data recovery. Further, since the chunk size is significantly larger than the minimum size packet that is brought into the system, there needs to be a more efficient method to transfer small packets through the optical switch itself.

An optical system exhibits cross-talk and relatively high loss characteristics. Thus, errors that are incurred through the optical switch require error checking and correcting for a high degree of reliability. To pick a given chunk out of a stream of random bits requires framing information. Additionally, it is required to have a reasonably equal mix of zeroes and ones with reasonable limitation of continuous streams of zeroes and ones for DC balance 15L going through the optical switch, resulting in DC balance of light coming into the optical receiving circuitry from the switch itself.

SUMMARY OF THE INVENTION

The present invention is directed to a chunk format, which solves the various problems to allow a purely optical switch to operate at the core of a large-scale, high data throughput router. The format includes a preamble that allows each individual chunk to have clock and data recovery performed before the actual information within the chunk is received. The format further includes a chunk header that contains information specific to the entire chunk. The chunk according to the present format can contain multiple packets, with each packet having its own packet header for packet-specific information. The format provides for a scrambler seed which allows scrambling the data to achieve a favorable zero and one balance as well as minimal run lengths. There are many multiple scrambler seed values that are available to be used, such that there can be a random choice of scrambler seed for any particular chunk to avoid the malicious forcing of zero and one patterns or run length of bits zeroes and ones. There are a chunk cyclical redundancy check (CRC) as well as forward error correction (FEC) bytes to detect and/or correct any errors and also to insure a high degree of data and control integrity. Advantageously, a framing symbol inserted into the chunk format itself allows the receiving circuitry to identify or locate a particular chunk format. "Break Bytes" and "Make Bytes" fields located at the beginning of a chunk preamble precondition an optical receiver to a proper state before the actual chunk arrives at the receiver. A "Break Bytes" field is configured to maintain a 50% density of 0's and 1's for the transmit laser during the switch fabric "dark period." The receiver threshold level is quickly reestablished by setting the value of a "Make Bytes" field to all ones. The "Make Bytes" are followed by preamble bytes, which are alternating ones and zeroes.

Various aspects of the invention are described in concurrently filed, co-pending, and commonly assigned U.S. application Ser. No. 09/703,057, filed Oct. 31, 2000, entitled "System And Method For IP Router With an Optical Core," to concurrently filed, co-pending, and commonly assigned U.S. application Ser. No. 09/703,056, filed Oct. 31, 2000, entitled "System and Method for Router Central Arbitration," to concurrently filed, co-pending, and commonly assigned U.S. application Ser. No. 09/702,958, filed Oct. 31, 2000, entitled "Timing and Synchronization for an IP Router Using an Optical Switch," to concurrently filed, co-pending, and commonly assigned U.S. application Ser. No. 09/703,027, filed Oct. 31, 2000, entitled "Router Network Protection Using Multiple Facility Interfaces," to concurrently filed, co-pending, and commonly assigned U.S. application Ser. No. 09/703,043, filed Oct. 31, 2000, entitled "Router Line Card Protection Using One-for-N Redundancy" and to concurrently filed, co-pending, and commonly assigned U.S. application Ser. No. 09/703,064, filed Oct. 31, 2000, entitled "Router Switch Fabric Protection Using Forward Error Correction," the disclosures of which are incorporated herein by reference.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

A communication network router is a system that distributes information from multiple sources to multiple destinations in the network. At the core of a router is a switching fabric that directs the information from the multiple sources to the multiple destinations. A fabric is generally defined as a collection of devices that cooperatively perform routing functions. In accordance with embodiments of the present invention, all information flows through the fabric in substantially fixed sized data chunks. In some embodiments the switch fabric contains an optical switch.

Figure 1:
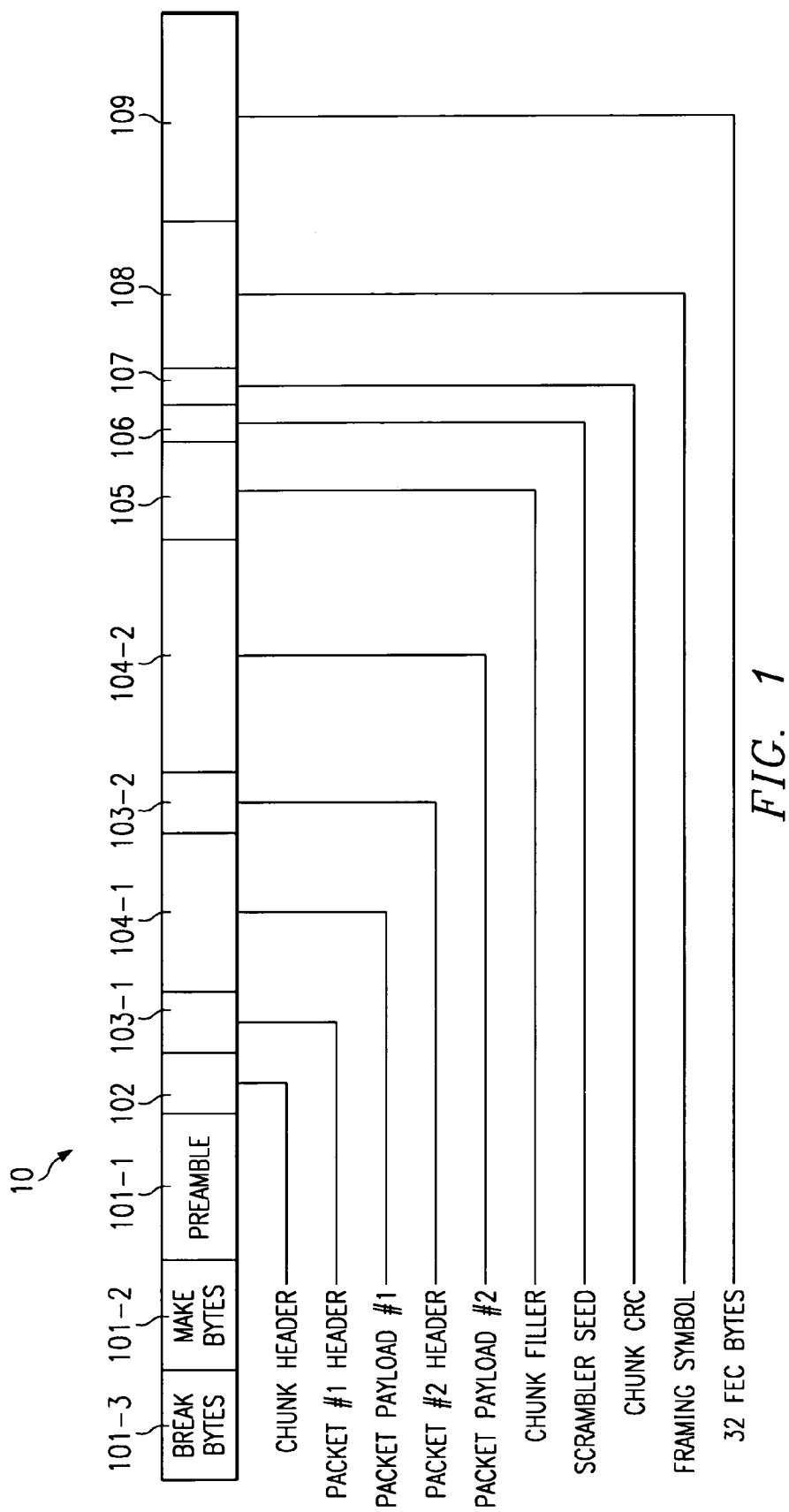
FIG. 1 is a block diagram illustrating the format of a data chunk in a communication network router.

FIG. 1 is a block diagram illustrating the format of a data chunk 10 in a communication network router. The chunk format starts with a preamble 101-1 programmable in length, sufficient to allow router clock and data recovery circuitry to properly phase align the circuitry to retrieve data out of the chunk. Two fields "Break Bytes" 101-3 and "Make Bytes" 101-2 respectively are located at the beginning of chunk preamble 101-1. The purpose of these fields is to precondition an optical receiver to a proper state before the actual chunk arrives at the receiver. The optical switch when changing configuration passes very little light through to the output fibers. During this period of time, designated the "dark period," the receivers receive no light and thus need to reestablish the decision threshold level of the limiting amplifier within the burst mode optical receiver. The threshold level is quickly reestablished by setting the value of the "Make Bytes" field 101-2 to all ones. "Make Bytes" 101-2 are followed by preamble bytes 101-1, which are alternating ones and zeroes.

The "Break Bytes" field 101-3 is configured to maintain a 50% density of 0's and 1's for the transmit laser. "Break Bytes" field 101-3 will have a higher density of zeros in order to balance the all ones in "Make Bytes" field 101-2. The "Break Bytes," "Make Bytes," and preamble fields are all programmable in length to allow flexibility. It is noted that the "Break Bytes" and "Make Bytes" fields can alternatively be located at the trailing end of the string of chunk fields in FIG. 1, since chunks are transmitted one after the other, end to end. Thus the "Break Bytes" and "Make Bytes" could correctly be placed before the preamble or after the trailing end of a chunk.

Referring again to FIG. 1, a chunk header 102 contains information including chunk type that is common to the entire chunk. There are four types of chunks, namely idle, administrative, guaranteed bandwidth and best effort chunks. Idle chunks are used strictly to travel between ASICs within the system as placeholders to maintain framing alignment. Administrative chunks are used to perform administrative functions across the optical switch. Administrative functions include dynamic alignment of chunks that are sent through the optical switch as well as keep-alive messages from a source to a destination of the optical switch to insure that the path is usable. Guaranteed bandwidth chunks carry guaranteed bandwidth traffic that is placed in those chunks, and best effort chunks carry best effort traffic. Best effort traffic is further self-divided into three best effort quality of service (QOS) levels, namely, best effort 1, 2 and 3. Guaranteed bandwidth chunks are separated from best effort chunks to allow guaranteed bandwidth traffic to pass ahead of best effort traffic through the optical switch, whereas best effort traffic stays in its original order through the switch.

Figure 2:
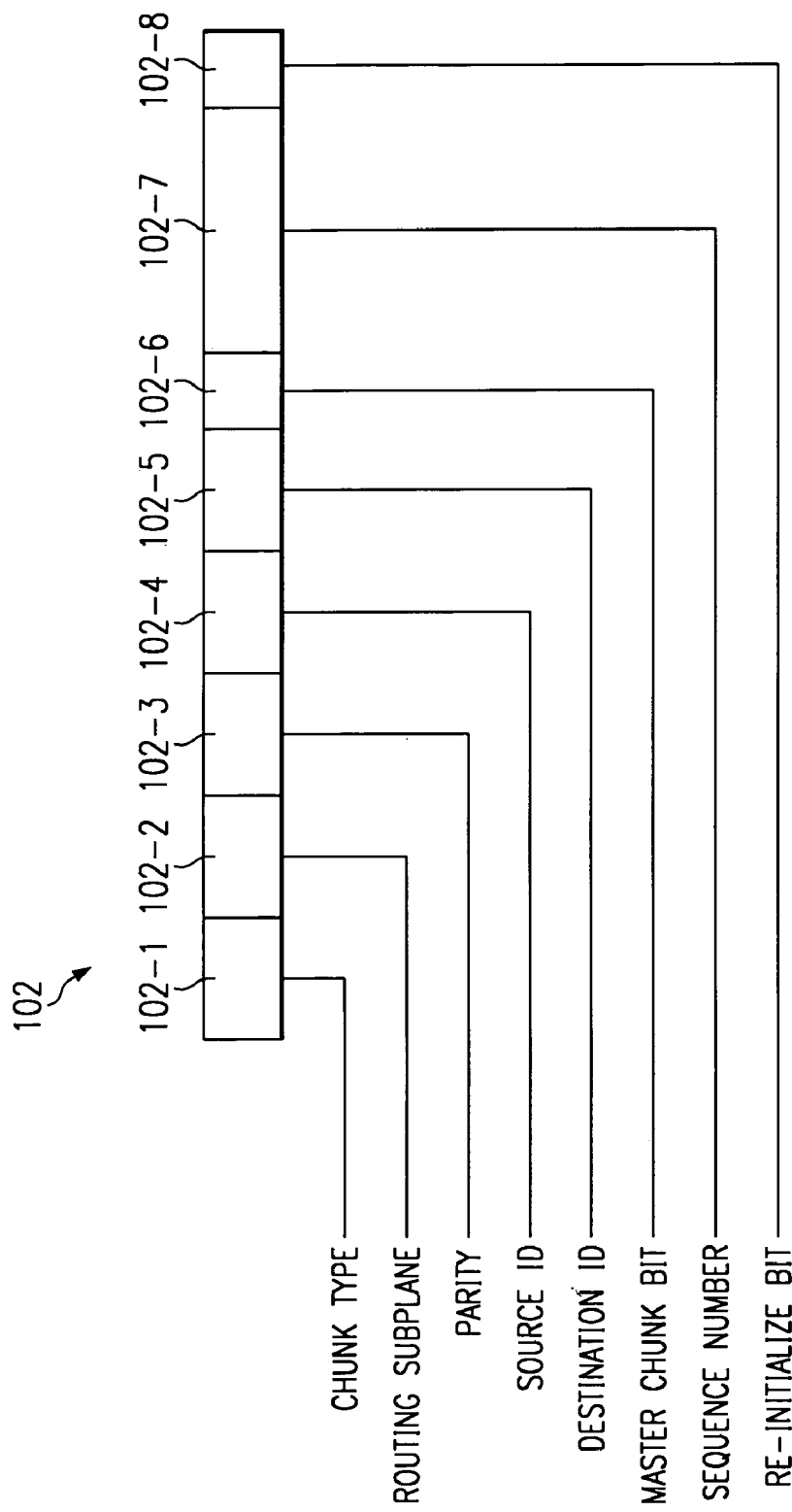
FIG. 2 is a block diagram illustrating the format of the chunk header of FIG. 1 in more detail.

FIG. 2 is a block diagram illustrating the format of chunk header 102 in more detail and showing a chunk type field 102-1. Additionally, within chunk header 102 is a specific routing subplane 102-2 through which the chunk will pass. In an embodiment of the present invention, there are six subplanes within the system. Accordingly, the routing subplane specifies through which of those six subplanes an individual chunk is destined. The routing subplane is used on the source side of the switch to steer the chunk to that specified subplane and on the destination side to check that the chunk was received on the specified subplane. This verifies the connectivity of the optical fibers connecting the subplanes to the receivers. Chunk header 102 includes a header parity 102-3 to verify that the chunk header is valid, as well as source and destination IDs 102-4 and 102-5 respectively to specify the source port and the destination port and to verify again that the fiber connectivity is correct.

Chunk header 102 includes a master chunk bit 102-6, which specifies that a particular chunk is a master chunk, such that every sixteenth chunk sent through the switch is designated as a master chunk. Chunk header 102 also contains a sequence number 102-7, providing for separate sequence streams for guaranteed bandwidth chunks and for best effort chunks. The sequence number is unique within a source/destination pair, such that a destination is able to look at the last sequence number received for a particular source and guarantee that no chunks were corrupted beyond the point of being able to use them. The sequence number is used for alarming and for alerting that a chunk potentially was corrupted. Further, in chunk header 102 there is a re-initialize bit 102-8 indicating that sequence number 102-7 should be re-initialized at the destination. This is used to enable sequence number re-initialization to avoid the alarming mechanism.

Each individual packet within chunk 10 has its own header, for example, fields 103-1 and 103-2, which includes information specific to that packet. Packet header information specifies whether a packet segment contained in the chunk is a packet start or a packet end, if that packet segment is the entire packet including both start and end, or whether the packet segment is the middle of the packet. This information is used for reassembling multi-chunk packets as well as for specifying whether a packet is contained completely within the chunk. Additionally, contained in a packet header is a byte count specifying the number of bytes contained in the packet segment associated with this particular packet header. Also included is a bit, which if active, indicates that the packet should never be discarded. This bit is frequently set for a guaranteed bandwidth packet in chunks marked as guaranteed bandwidth chunks. Best effort 1, 2 and 3 classes should be designated only if the chunk has been indicated as a best effort chunk. There is a Point-to-Point Protocol (PPP) header format specifying how the destination facility module should treat the packet in terms of what PPP format should be appended to the chunk as it is being sent out. Packet header 103-1, 103-2 also contains a bit indicating whether the packet should be sent out through the output of the router or whether it should be looped back into the destination packet forwarding engine to be used by that packet forwarding engine. Packet header 103-1, 103-2 also includes a destination tributary indicator specifying to which tributary at a destination port the packet should be sent.

Fields 104-1 and 104-2 within the chunk format are the actual payloads of the packets associated with respective packet headers 103-1 and 103-2. Packet header/payload pairs, for example 103-1 and 104-1, can be contained within the chunk payload up to a limit on the order of nine of these pairs, due to the 400 byte total payload size of a chunk versus a minimum packet size of 40 bytes. A chunk filler 105 is the next field. If there are not sufficient data in packets to fill the chunk payload, then the unused payload capacity is filled with non-traffic bytes.

The next field is a scrambler seed 106. The scrambler seed value is used to insure an equal balance of zeroes and ones across a chunk as well as to minimize the run lengths of ones and zeroes respectively across the chunk. A particular scrambler algorithm used for the chunk format does not insure a particular run length of zeroes and ones but minimizes that run length by scrambling of the bits.

The next field is a two-byte chunk CRC 107 used to insure that the overall chunk consisting of fields 102 through 107 has the proper CRC value once it is corrected by the forward error correcting (FEC) information described below in more detail. Fields 102 through 107 in the present router implementation contain a total of 400 bytes, including four bytes for chunk header 102, four bytes for each packet header 103-1, 103-2, a flexible number of bytes for packet payloads, for example 104-1, 104-2, two bytes for scrambler seed 106, two bytes for CRC 107, and the remainder in chunk filler 105.

The next field in sequence is a framing symbol 108, which is 16 bytes in length and is used to determine where in a stream of bits beginning and trailing end of a chunk are located. Framing symbol 108 is a unique symbol that must be found within a window roughly 10 nanoseconds in size, in order to identify a chunk. The framing symbol could be found anywhere within those 10 nanoseconds and it must be guaranteed that the framing symbol is unique within those 10 nanoseconds worth of bits.

Sixteen-byte framing symbol 108 is located near the trailing end of the chunk format, because the trailing end of the chunk format is a more reliable place than the beginning of the chunk to position the framing symbol. The beginning of the chunk format near preamble 101-1 has a potential for being unreliable, in that it takes more than the expected number of bits to acquire the phase of the incoming signal of bits of information, and the first few bits of the fields at the beginning of the chunk may become corrupted whereas the trailing end of the chunk should not suffer from that problem. Accordingly, framing symbol 108 is located near the trailing end of chunk 10, to insure with the highest probability that it is received without errors. Since framing symbol 108 is not covered by FEC field 109, the framing symbol must be received without any correction applied to it. For greater reliability two bytes of 16-byte framing symbol 108 are placed just before FEC field 109, and 14 bytes worth of bits are intermixed into the preceding 56 bytes of fields. Accordingly each of these preceding 56 bytes contains two bits of framing symbol 108 and six bits of actual data.

In an embodiment of the present invention, a 400-byte chunk payload is delivered to an internal optics ASIC, which generates 32 FEC bytes. Once the 32 FEC bytes are generated, then 16-byte framing symbol 108 is inserted into the chunk payload. Viewing the 400-byte chunk payload as a bit stream, framing symbol 108 is inserted as two bits of framing symbol per six bits of data at the trailing end of the 400-byte chunk payload. Of the 16-byte framing symbol, 2 bytes are inserted after the 400-byte payload, and the other 14 bytes are intermixed two bits at a time per 6 bits of other data. The two bits that are intermixed always have the same value, a zero and a one bit. These two bits ensure that, when the internal optics ASIC scans the payload within the framing window, it will find no other framing symbol pattern until it actually finds the intended framing symbol. Once the framing symbol bits are inserted, then the 32 FEC bytes are appended. Once the framing symbol is inserted, then the intermixed fields are no longer byte aligned fields.

Figure 3:
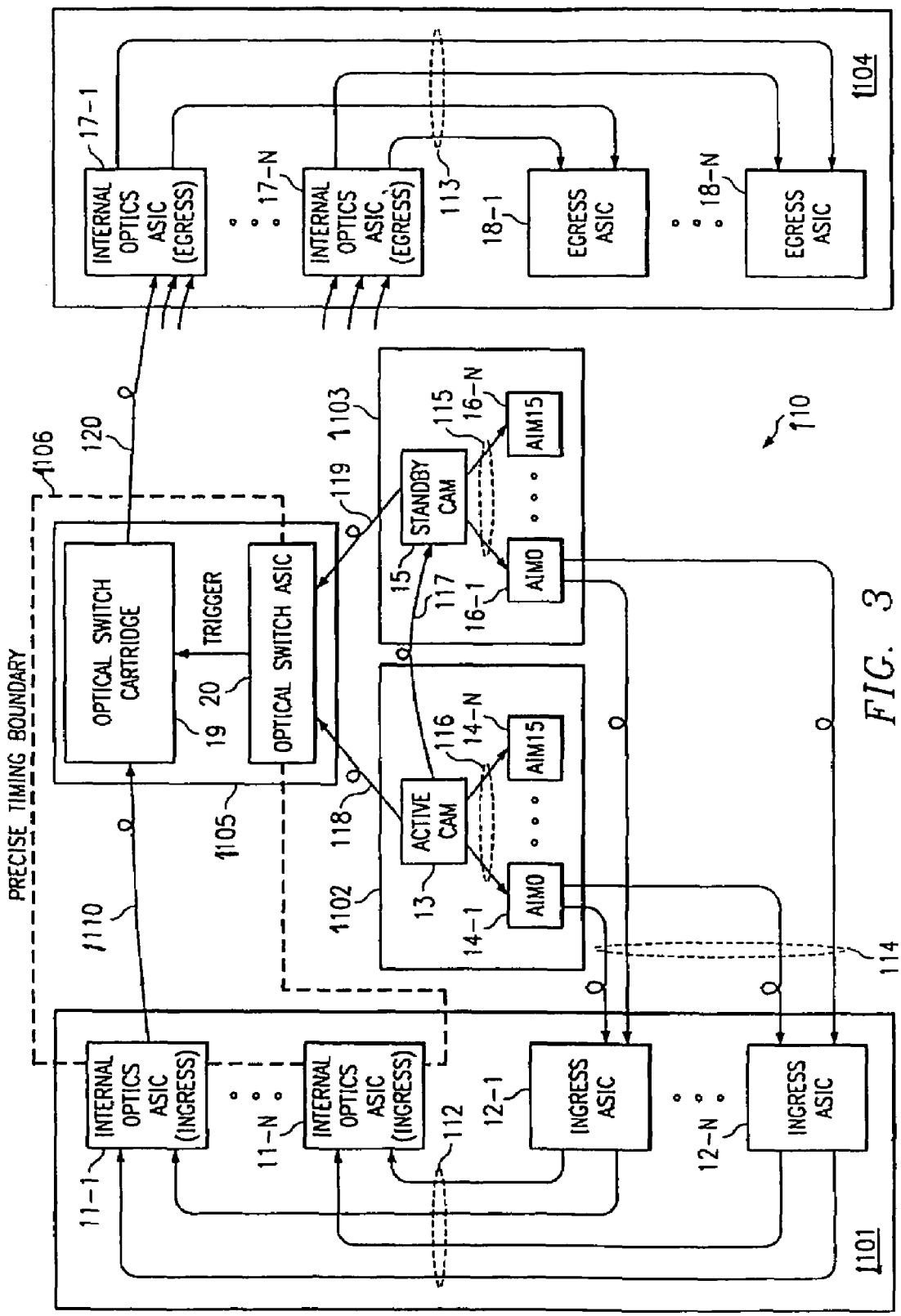
FIG. 3 is a simplified block diagram of a router.

FIG. 3 is a simplified block diagram of a router 110, according to an embodiment of the present invention. Router 110 includes an ingress side line shelf 1101 and an egress side line shelf 1104. In some embodiments, ingress and egress line shelves 1101 and 1104 are a single unit, but in FIG. 3 they are illustrated for clarity as separate units. A router also includes a switching fabric. A fabric is a collection of devices which cooperatively provide a general routing capability. One example of a switching fabric is a centralized crossbar. Router 110 includes an optical switch 19 configured as a crossbar. Router 110 further includes arbiter (ARB) shelves 1102 and 1103 and an optical switch shelf 1105. A typical system includes four optical switch shelves 1105, two ARB shelves 1102 and 1103, and up to 64 line shelves 1101, 1104 in combination. One skilled in the art could vary these combinations, which are used strictly to illustrate the essential elements of the invention.

Within ARB shelf 1102 is contained a central arbiter module (CAM) 13 which is designated the active CAM. Active CAM 13 is the central point of arbitration which passes information both to optical switch shelf 1105 through a link 118 and to an arbiter interface module (AIM) 14-1 through 14-N through links 116. Active CAM 13 determines for each switch cycle the configuration of each optical switch cartridge 19 in shelf 1105. There is only one active central arbiter module for the entire router.

Within router 110 there are two concepts of a cycle: a clock cycle and a chunk period. A chunk is defined as a uniformly sized piece of information that is passed through optical switch cartridge 19 during one cycle of the switch. All information moves through optical switch cartridge 19 in chunks. A chunk is a fixed sized quantity of information, which in this particular embodiment is 330 nanoseconds long. An actual chunk contains 400 bytes of payload information and on the order of 50 bytes of overhead, for example headers and trailers. After a chunk passes through optical switch cartridge 19, then before another chunk can pass through, the configuration of optical switch cartridge 19 is typically changed.

In each optical switch cycle there is a segment of time during which chunks of information go through optical switch cartridge 19 and another segment of time during which the optical switch cartridge 19 is reconfigured for a next chunk. These two segments of a switch cycle, termed respectively "dark period" during which optical switch cartridge 19 is reconfigured and essentially no information passes through it and the "light period" during which information passes through the optical switch, are together termed a "chunk period".

Active CAM 13 determines the configuration for the optical switch and must do so for every chunk period. Active CAM 13 receives request information when packets arrive in the router. Eventually, the requests make their way to active CAM 13. Active CAM 13 then analyzes all the requests from the various input sources and passes configuration information for a chunk period through links 118 to an optical switch ASIC 20 in optical switch shelf 1105. Active CAM 13 also passes grants through links 116 to AIM modules 14-1 through 14-N. AIM modules 14-1 through 14-N then pass that grant information back to ingress ASICs 12-1 through 12-N through fiber optic links 114. Ingress ASICs 12-1 though 12-N receive the grant and create the actual information payload that is in a chunk. That information payload is then passed to internal optics ASIC 11-1 through 11-N. The internal optics ASICs 12-1 through 12-N take the information payloads, append Forward Error Correction (FEC) information and encapsulate them into chunks.

Forward Error Correction is used to correct any bit errors incurred through the optical switch at the egress internal optics ASIC 17-1 through 17-N. In this fashion chunks of information from the ingress internal optics ASICs 11-1 through 11-N pass through a fiber optic link 110 and subsequently through optical switch cartridge 19. The chunks then pass through links 120 to egress internal optics ASIC 17-1 through 17-N.

Egress internal optics ASIC 17-1 through 17-N receive the chunk information and use the FEC information to correct any bit errors that occurred in the chunk. Once that correction is complete, egress internal optics ASICs 17-1 through 17-N pass the chunk information to egress ASICs 18-1 through 18-N, from which the information is then passed out to the destination ports of Router 110.

A standby CAM 15 in standby ARB shelf 1103 provides additional fault tolerance. In the event of any failure in active CAM 13, standby CAM 15 is available to continue making decisions on configuration information for the optical switch on a chunk-by-chunk basis. In standby ARB shelf 1103, are also standby AIM modules 16-1 through 16-N. Similar to links 116, links 115 communicate from standby CAM 15 to AIM modules 16-1 through 16-N, and links 114 pass the standby grant information from standby AIM modules 16-1 through 16-N to ingress ASIC 12-1 through 12-N.

Accordingly, ingress ASICs 12-1 through 12-N receive a grant from AIM modules 14-1 through 14-N or 16-1 through 16-N and build the chunk information that is passed on to internal optics ASICS 11-1 through 11-N. The information used to build chunks is provided by the packets arriving from the input interface of Router 110 and are then queued up in ingress ASICs 12-1 through 12-N. Ingress ASICs 12-1 through 12-N make requests to AIM modules 14-1 through 14-N and 16-1 through 16-N that are passed on to active CAM 13 and standby CAM 15. Those requests are for chunks of information to go through optical switch cartridge 19. Active CAM 13 and standby CAM 15 make the decision which requests to honor, and the resulting configuration control is passed to optical switch cartridge 19 through links 118 and 119. At the same time, grants based on that decision are passed back to AIMs 14-1 through 14-N and 16-1 through 16-N, and then on to ingress ASICs 12-1 through 12-N through links 114. Ingress ASICs 12-1 through 12-N receive a grant and then access chunk building instructions associated with the grant out of a queue. The chunk building instructions specify which packets to assemble into a uniform sized chunk payload containing 400 bytes of information. Ingress ASICs 12-1 through 12-N send those chunk payloads on to internal optics ASICs 11-1 through 11-N to be sent through optical switch 19.

Active CAM 13 distributes timing through the rest of router system 110, with the objective to get the switch configuration control information to optical switch 19 concurrently with the arrival of a corresponding data chunk that is built at ingress ASICs 12-1 through 12-N and passed through internal optics ASICs 11-1 through 11-N. The control information and the corresponding data chunk have to arrive simultaneously at optical switch 19. Alignment is very critical, in that there is a particular time window within which chunks of information must arrive at optical switch 19 in order to pass through the switch. If the arrival of a chunk is too early or too late relative to reconfiguration of the optical switch, then the chunk will be truncated based on the new optical switch configuration. Accordingly, the chunk data must be aligned through the switch during a "light period" and in between the "dark periods" when the switch is being reconfigured. In the present example, the chunk period is roughly 330 nanoseconds, consisting of chunk information roughly 280 nanoseconds long and a dark period 50 nanoseconds long. Of the 50-nanosecond dark period, it actually requires roughly 40 nanoseconds to reconfigure the switch, leaving approximately a 5-nanosecond margin at either side of the dark period for aligning the chunk information with that time window properly, in order not to truncate the chunk information as it goes through the optical switch.

The optical switch has, in the current implementation, 64 inputs that each go to any of 64 outputs. At any given chunk period, any of the 64 inputs can be connected to any of the 64 outputs, with one-to-one mapping between inputs and outputs as the only restriction. There are no other restrictions on mapping of input to output at any chunk period. Thus, the current optical switch is a complete crossbar. The configuration information tells optical switch ASIC 20 how to configure the switch inputs and outputs in a given chunk period.

Referring to the previously described operation, packets that come into router 110 at the source of the router go to ingress ASICs 12-1 through 12-N, which send requests to CAM 13, and receive grants that come back from active CAM 13. Ingress ASICs 12-1 through 12-N build information chunk payloads, which have a specific destination within the router in order to go out of the router on a particular output port. Configuration information that is sent out from active CAM 13 to optical switch cartridge 19 tells how to configure the inputs to the outputs of optical switch cartridge 19, such that packets overall are switched from the desired input to the desired output of router 110.

Packets come in through the input of router 110, having packet sizes in a range from approximately 40 bytes up to approximately 9600-byte jumbo packets. At ingress ASICs 12-1 through 12-N those packets are queued up, requests are made to CAM 13, and grants come back. Ingress ASICs 12-1 through 12-N upon receiving a grant will extract out of its queue or multiple queues enough packet information all heading to the same destination to fill up a single chunk. Multiple small packets totaling 400 bytes that are all headed from one ingress ASIC to a common destination within router 110 can be assembled into one chunk. Therefore several IP packets can be accumulated and assembled to form a single chunk, which for the purpose of moving through router 110 functions as a single data unit, but is subsequently broken down into its original component packets before being delivered to a router output port.

Conversely, a large packet exceeding one chunk in size is segmented into segments of approximately 400 bytes and inserted into multiple chunks. Each segment is roughly 400 bytes. Chunks exist only while traveling within the router from the ingress side to the egress side. Once at the egress side, a chunk that contains multiple small packets is decomposed into its original packets, and chunks that contain segments of a larger packet are accumulated and then reassembled into the original larger packet. The information is then sent out of router 110 in the form of the original packets.

Thus, requests that are issued from the ingress ASIC 12-1 through 12-N are passed to an arbiter interface module (AIM). The AIM passes those requests up to the central arbiter module, which receives requests from all the input requesting sources and on every chunk period examines all the outstanding requests and decides which request to honor to configure the switch for that particular chunk period. Active CAM 13 then sends configuration information to the optical switch, so that the switch can be configured to honor that request. It also sends a grant back through the AIM modules to ingress ASICs 12-1 through 12-N. Those grants, associated with the requests that were previously made, instruct ingress ASICs 12-1 through 12-N which configuration the optical switch will be on a future chunk period, so that the ingress ASICs can form chunks to send through the optical switch.

The arrows in FIG. 3 show the paths that are used to distribute timing information throughout router system 110. Not shown for simplicity in FIG. 3 are the request paths that go from ingress ASICs 12-1 through 12-N to AIM modules 14-1 through 14-N and then on to active CAM 13. CAM 13 grants requests a number of chunk cycles in advance (typically six chunk periods) of when the optical switch is actually needed in a given configuration. Using a pipeline process, it takes approximately six chunk periods for configuration information to actually make its way to optical switch cartridge 19 and also roughly six chunk periods for the grants to make their way back to ingress ASIC 12-1 through 12-N, to build the chunk, and to forward the chunk to the optical switch. Accordingly, the data path from active Cam 13 through the ingress and internal optics ASICs to the optical switch is roughly six chunk periods long, as is the path of configuration information from active CAM 13 through optical switch ASIC 20 to optical switch cartridge 19.

In some embodiments (see U.S. application Ser. No. 09/703,057, cited above), ingress ASICs 12-1 through 12-N and egress ASICs 18-1 through 18-N are each contained in a packet forwarding module. Each packet forwarding module in turn is interconnected with router input and/or output ports through facility interfaces. In some embodiments each packet forwarding module receives and/or sends duplicate input data packets in parallel through paired redundant facility interfaces. A group of N packet forwarding modules are interconnected into a protection group configured for one-for-N protection, having one protect packet forwarding module for N working packet forwarding modules, where N is a positive integer greater than two, typically 4.

In FIG. 3, paths or links that are contained within a respective shelf 1101 through 1105 are electrical in nature. They are contained within a given shelf, such that a path distance is a relatively short fixed distance between modules on a backplane. On the other hand, paths that go between shelves 1101-1105 are fiberoptic links, which are variable in distance and thus in propagation delay, depending on locations of various racks and shelves within overall router system 110. The timing distribution mechanism must deal with those variable lengths, such that the data and the configuration control still reach the optical switch cartridge simultaneously.

In operation, a receiving ASIC looks for the framing symbol. There is enough variation in arrival times of chunks that the receiving ASIC starts looking for the framing symbol up to 56 bytes before the actual framing symbol. To make sure that the receiving ASIC does not incorrectly find another string of bits having the same pattern as the framing symbol, 14 bytes of the framing symbol are forced two bits per byte into the preceding 56 bytes of the chunk. The receiving ASIC finds the framing symbol and then stops looking. Accordingly there is no need to force in extra bits after the framing symbol. If the receiving ASIC is still looking for the framing symbol after the point where it should be located, it means that the framing symbol is corrupted. If the framing symbol is corrupted, then the receiving ASIC relies on the redundancy in the system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of passing received Internet Protocol (IP) data packets through a network device, said method comprising:
constructing within said network device a chunk with a payload that is sized to fit more than one of said IP data packets;
formatting said chunk to include at least one of:
a forward error correction (FEC) code; and
a cyclical redundancy check (CRC) code;
filling said payload of said chunk with a portion of at least one said IP data packet;
including a framing symbol in each said chunk; and
passing said chunk through a switch fabric of said network device.

2. The method of claim 1 further comprising inserting said framing symbol adjacent to the trailing end of said chunk.

3. The method of claim 1 wherein said passing comprises using said framing symbol to determine uniquely within a stream of bits the beginning and the trailing end of said chunk.

4. The method of claim 1 further comprising using said FEC encoded in each said chunk to detect and correct errors in said chunk.

5. The method of claim 4 further comprising using said CRC encoded in each said chunk to determine that the entire said chunk has a proper CRC value.

6. The method of claim 1 further comprising:
formatting said chunk to include a scrambler seed, and wherein said formatting comprises using said scrambler seed in said chunk to balance zeroes and ones and to minimize run lengths of zeroes and ones by scrambling bits across said chunk.

7. The method of claim 1 further comprising:
formatting said chunk to include a "Break Bytes" field and a "Make Bytes" field, said fields configured to precondition an optical receiver prior to the arrival of said chunk.

8. The method of claim 7 wherein said "Break Bytes" field and said "Make Bytes" field are programmable in length.

9. The method of claim 7 wherein said passing comprises using said "Break Bytes" and said "Make Bytes" field to precondition on optical receiver prior to the arrival of a chunk.

10. The method of claim 9 wherein "Make Bytes" field reestablishes a decision threshold level of a limiting amplifier within a burst mode optical receiver.

11. The method of claim 1 further comprising: formatting said chunk to include adding a chunk header.

12. The method of claim 11 wherein said chunk header includes identification of chunk type.

13. The method of claim 11 wherein said chunk header includes a header parity.

14. The method of claim 11 wherein said chunk header includes an indication that said chunk is a master chunk.

15. The method of claim 11 wherein said chunk header includes a sequence number.

16. The method of claim 15 further comprising:
performing error detection and correction using said sequence number in said chunk header for alarming and for alerting that a chunk potentially was corrupted.

17. The method of claim 16 wherein a re-initialize bit is used to enable reinitialization of said sequence number, such that said alarming is avoided.

18. The method of claim 1 wherein said chunk contains multiple data packets.

19. The method of claim 1 wherein said sized chunk contains a segment of a data packet, said data packet having a length greater than the size of said chunk.

20. An Internet Protocol (IP) packet router, said router comprising:
at least one chunk having a payload comprising a plurality of IP data packets and a framing symbol; and
a switch fabric through which said chunk passes;
wherein a respective chunk includes at least one of:
a forward error correction (FEC) code, and
a cyclical redundancy check (CRC) code.

21. The IP packet router of claim 20 wherein said framing symbol is located adjacent the trailing end of each said chunk.

22. The IP packet router system of claim 20 wherein said FEC coding is located adjacent to and following said framing symbol.

23. The IP packet router claim 20 wherein each said chunk is formatted to include a chunk header.

24. The IP packet router of claim 23 wherein said chunk header includes identification of chunk type.

25. The IP packet router claim 23 wherein said switch fabric is partitioned into a plurality of working subplanes.

26. The IP packet router claim 25 wherein said chunk header includes identification of a specific routing subplane through said switch fabric.

27. The IP packet router of claim 23 wherein said chunk header includes a header parity.

28. The IP packet router of claim 23 wherein said chunk header includes identification of an input of said switch fabric and an output of said optical switch fabric for said chunk.

29. The IP packet router system of claim 23 wherein said chunk header includes a master chunk bit.

30. An Internet Protocol (IP) packet router system, said system comprising:
at least one chunk having a payload comprising a plurality of data packets and a framing symbol; and
an IP packet router, including:
a switch fabric through which said chunk passes; and,
a first electrical switch stage at an input side of said switch fabric and a second electrical switch stage at an output side of said switch fabric,
wherein each said chunk is formatted to include a chunk header and at least one of:
a forward error correction (FEC) code, and
a cyclical redundancy check (CRC) code, and
wherein said chunk header includes a sequence number.

31. The IP packet router system of claim 20 wherein said payload of said at least one chunk further comprises at least one packet segment and an associated packet header.

32. A method of information flow through an IP packet network system device, said method comprising:
encapsulating within said network device input IP data packets from a plurality of source ports into chunks, wherein a respective chunk includes at least one of:
a forward error correction (FEC) code, and
a cyclical redundancy check (CRC) code;
formatting overhead information onto each of said chunks, said overhead including a framing symbol;
sending said chunks to a switch plane of said IP network device.

33. The method of claim 32 further comprising:
converting said directed chunks into electrical signals;
sending said chunks from said switch plane;
performing error detection and error correction on said chunk;
removing said overhead information from said chunks; and
reassembling said input data packets out of said chunks.

34. The method of claim 32 wherein all information flows through said switch plane in said chunks.

35. The method of claim 32 further comprising:
formatting said chunks to include a chunk header.

36. The method of claim 35 wherein said appropriate switch plane is one of a plurality of subplanes comprising a portioned switch fabric.

37. The method of claim 36 wherein said chunk header includes identification of a specific routing subplane through said switch fabric.

38. The method of claim 37 wherein said directing comprises using said identification in said chunk header of a specific routing subplane to route said chunks through said switch fabric.

39. The method of claim 35 wherein said chunk header includes identification of an input of said appropriate switch plane and an output of said appropriate switch plane for said chunk.

40. The method of claim 39 wherein said directing comprises using said identification in said chunk header of said input and said output to route said chunks through said switch plane.

41. The method of claim 39 further comprising:
performing error detection and correction using said identification in said chunk header of said input and said output to verify the route of said chunks from said input and said output.

42. The method of claim 35 wherein said chunk header includes identification of chunk type.

43. The method of claim 42 wherein said directing comprises using said identification of chunk type in said chunk header to enable guaranteed bandwidth chunks to pass ahead of best effort chunks through said switch plane.

44. The method of claim 32 wherein said switch plane is part of a switch fabric.

45. The method of claim 32 wherein said sending comprises using said framing symbol in each said chunk to determine uniquely within a stream of bits a beginning and a trailing end of each said chunk.

46. The method of claim 1, further comprising:
stripping said IP data packets from said chunk within said network device.

47. The IP packet router of claim 20, further comprising:
a first stage at an input side of said switch fabric and a second stage at an output side of said switch fabric,
wherein said first stage is operable to construct said chunk, and said second stage is operable to strip said data packets from said chunk.

* * * * *

UNITED STATES PATENT AND TRADEMARK OFFICE
CERTIFICATE OF CORRECTION

| | | |
|---|---|---|
| PATENT NO. | : 7,613,183 B1 | Page 1 of 1 |
| APPLICATION NO. | : 09/703038 | |
| DATED | : November 3, 2009 | |
| INVENTOR(S) | : Tony M. Brewer et al. | |

It is certified that error appears in the above-identified patent and that said Letters Patent is hereby corrected as shown below:

In claim 1 (at column 10, line 29), please replace the ";" with --,--.

In claim 30 (at column 11, line 55), please remove the "," at the end of the line.

In claim 30 (at column 11, line 62), please replace the "," with a --;--.

Signed and Sealed this

Nineteenth Day of January, 2010

David J. Kappos
*Director of the United States Patent and Trademark Office*